(12) United States Patent
Sotgiu et al.

(10) Patent No.: US 7,740,043 B2
(45) Date of Patent: Jun. 22, 2010

(54) TIRE CHANGER APPARATUS

(75) Inventors: Paolo Sotgiu, Modena (IT); Antonio Fragale, Carpi (IT)

(73) Assignee: Snap-On Equipment SRL a Unico Socio, Correggio (Re) (IT)

( * ) Notice: Subject to any disclaimer, the term of this patent is extended or adjusted under 35 U.S.C. 154(b) by 117 days.

(21) Appl. No.: 12/078,742

(22) Filed: Apr. 4, 2008

(65) Prior Publication Data
US 2008/0257501 A1 Oct. 23, 2008

(30) Foreign Application Priority Data
Apr. 5, 2007 (EP) ................... 07007222
Nov. 15, 2007 (EP) ................... 07022237

(51) Int. Cl.
*B60C 25/132* (2006.01)
(52) U.S. Cl. .............. 157/1.17; 157/1.24; 157/1.28
(58) Field of Classification Search ............... 157/1.17, 157/1.2, 1.22, 1.24, 1.26, 1.28
See application file for complete search history.

(56) References Cited
U.S. PATENT DOCUMENTS

| | | | | |
|---|---|---|---|---|
| 3,164,199 A * | 1/1965 | Swenson et al. | ........... | 157/1.24 |
| 4,606,393 A * | 8/1986 | Cuccolini | ............... | 157/1.24 |
| 6,880,606 B2 * | 4/2005 | Gonzaga | .................... | 157/1.28 |
| 6,935,397 B2 * | 8/2005 | Gonzaga | .................... | 157/1.28 |
| 7,108,035 B2 * | 9/2006 | Corghi | ....................... | 157/1.17 |
| 7,188,657 B2 * | 3/2007 | Boni | ........................ | 157/1.24 |

FOREIGN PATENT DOCUMENTS

| | | |
|---|---|---|
| EP | 0 042 363 A1 | 12/1981 |
| EP | 1334846 A2 * | 8/2003 |
| EP | 1 623 850 A1 | 2/2006 |

OTHER PUBLICATIONS

European Search Report issued in European Patent Application No. EP 07022237.7 dated Jul. 4, 2008.

* cited by examiner

*Primary Examiner*—D. S Meislin
(74) *Attorney, Agent, or Firm*—McDermott Will & Emery LLP

(57) ABSTRACT

Tire changer apparatus having a horizontally extended frame; a wheel holder device provided on said frame and designed to support a tired wheel (14) with horizontally positioned wheel axis; a carriage supported movably along the frame; a tool holder provided on the carriage; at least one tire changing tool for mounting the tire onto the wheel and/or for demounting the tire from the wheel; and actuator means to move the tool holder on the carriage to operating positions in which the tire changing tool is able to act on the tire for mounting or demounting on both sides of the tire, wherein during the mounting operation or demounting operation the carriage is driven by an actuator device along the frame; the tool holder is movably supported on a tool holder carriage which is movably supported on said carriage and driven by an additional actuator device provided on said carriage, and said additional actuator device is in drive connection with the tool holder carriage via a mechanical speed-increasing transmission.

11 Claims, 6 Drawing Sheets

TIRE CHANGER APPARATUS

TECHNICAL FIELD

The present invention concerns a tyre changer apparatus.

BACKGROUND

An apparatus of that kind is known from EP 1 334 846 B1. The known apparatus has a wheel holder device provided on a frame. The wheel holder device supports the tyred wheel with horizontally positioned wheel axis. A carriage provided with tyre changing tool is movably supported on the frame along guides. The tyre changing tool is supported on the carriage by means of a tool holder which can be rotated about its longitudinal axis. To move the tyre changing tool to operation positions in which the tool is able to act on the tyre for mounting or demounting on one of the both sides of the tyre, the carriage is moved along the guides of the frame and the tool holder is rotated synchronously with the movement of the carriage. To create the forces which are needed for the mounting or demounting actions of the tool, the carriage is driven by an actuator. Thus, the carriage of the known apparatus is used for the movement of the tool between its two operation positions and for the transmission of the forces which are needed for the mounting and demounting actions.

The object of the invention is to provide a tyre changer apparatus with which the time for the movement of the tyre changing tool between its two operation positions and the tool stroke adjusted can be shortened.

That object is solved by features in accordance with the invention. Advantageous modifications of the invention are characterized in an embodiment.

SUMMARY

According to the invention, the tool holder is movably supported on a tool holder carriage which is movably supported on the carriage which is driven by an associated actuator device during the mounting action and the demounting action. The tool holder is driven by an additional actuator device provided on the carriage. The additional actuator device is in drive connection with the tool holder carriage via a mechanical speed-increasing transmission.

The inventive tyre changer provides an automatic and rapid movement of the tool especially for heavy vehicle wheels from the active (operating) position on one side of the wheel to the active (operating) position on the other side of the wheel. It is possible to define the movement of the tool-holder carriage beforehand and the tool stroke can be adjusted and optimized in dependence of the width of the tyre. It does not require other input from the operator except that related to starting respective step. Further, a compact and fast transmission for the tool-holder carriage for its travel along a direction parallel with the axis of the wheel are provided.

BRIEF DESCRIPTION OF THE DRAWINGS

The invention is described in detail with reference to the drawings which show in.

DETAILED DESCRIPTION

Figure 1:
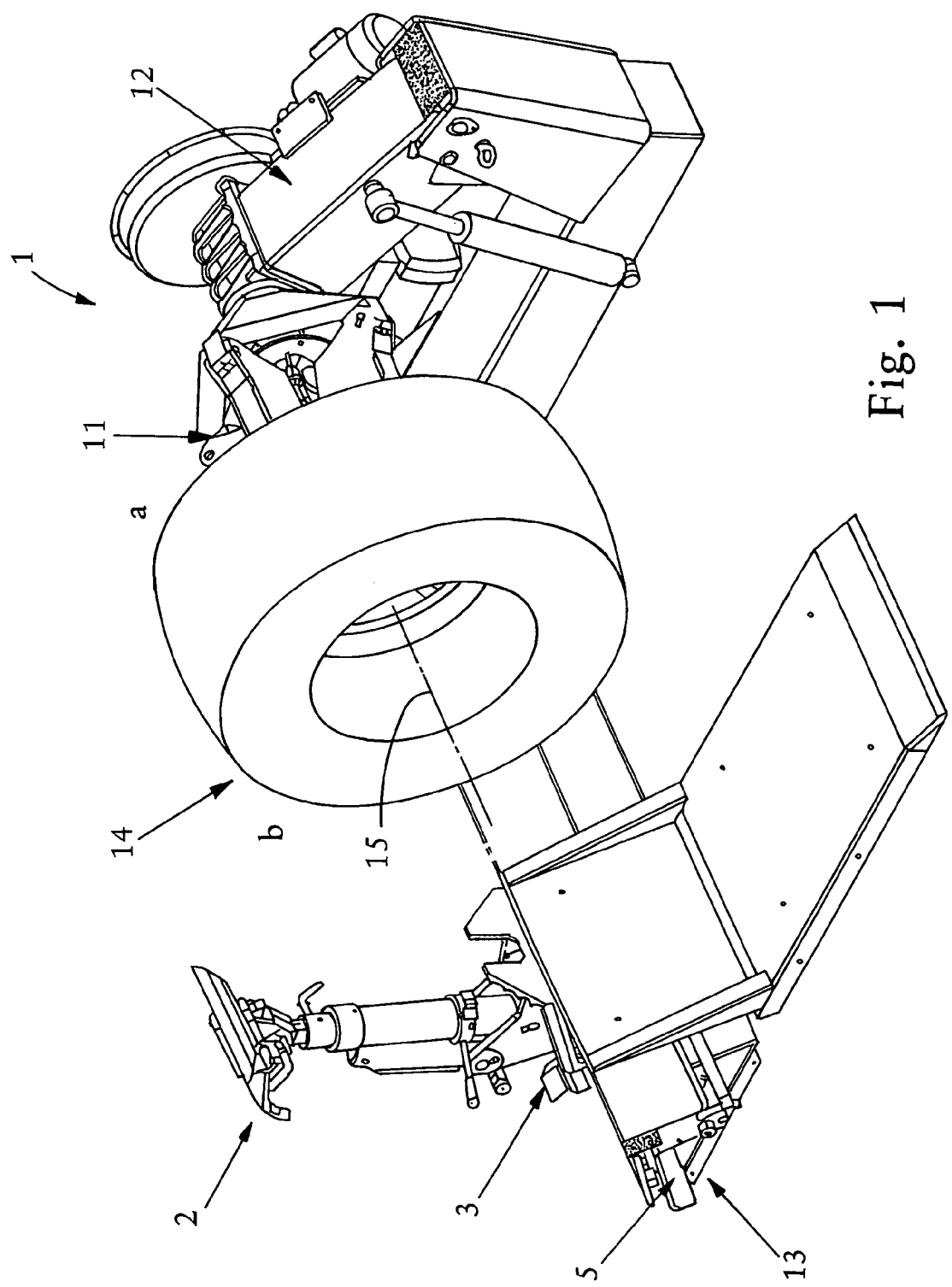
FIG. 1 an embodiment of the invention.
Figure 3:
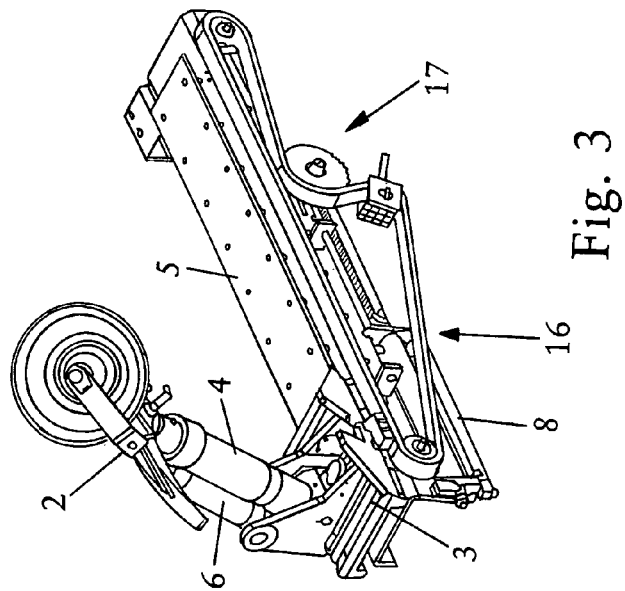
FIG. 3 the parts of FIG. 2 in assembled depiction.
Figure 2:
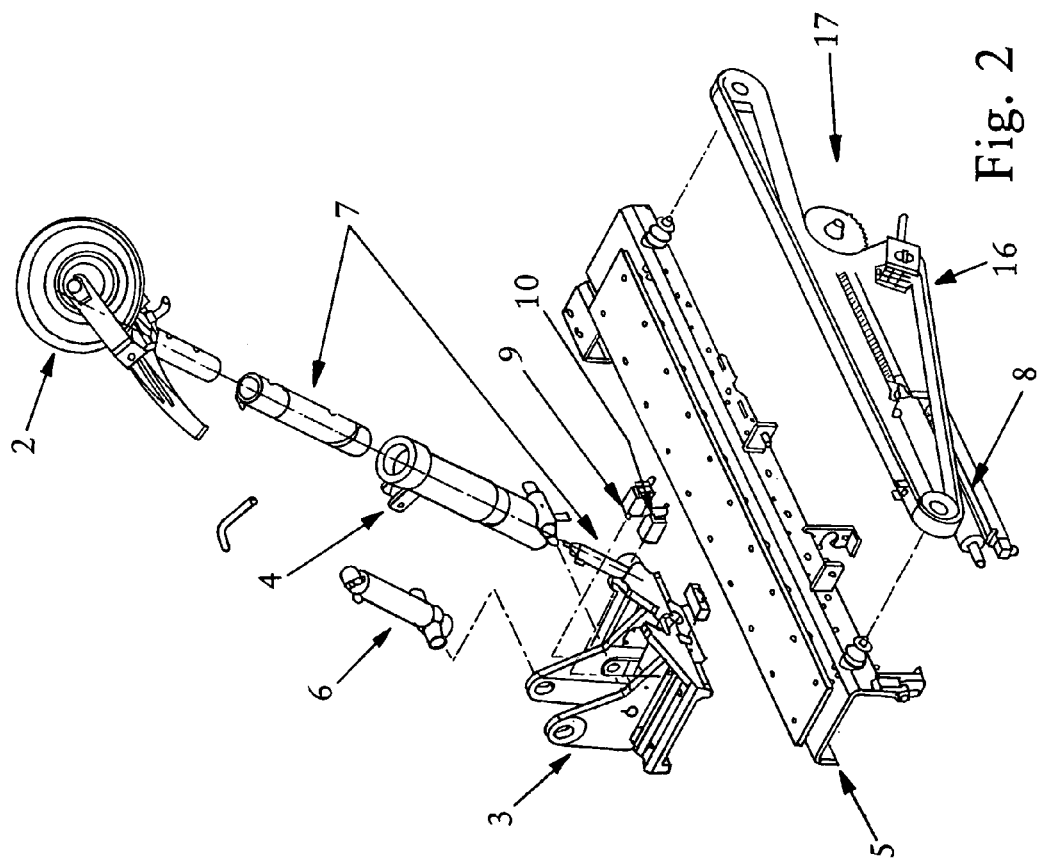
FIG. 2 parts of the embodiment of FIG. 1 in exploded depiction.

FIG. 1 depicts a tyre changer machine for wheels of industrial or heavy vehicles like trucks, power shovels, tractors, etc. The machine has a frame 13 on which a wheel-holder arm 12 of a wheel holder device pivots. Said arm supports a wheel clamping and centring device 11 which constrains a wheel 14 to the arm 12. One end of the frame 13 supports a carriage 5 which moves in a direction parallel with the axis 15 of rotation of the wheel. A tool-holder carriage 3 slides on said carriage 5 and can move along a direction parallel with the axis 15 of the wheel 14. On the tool-holder carriage 3 there is a tool holder 4 on which a tyre changing tool 2 is placed. The carriages 3 and 5 are moved by suitable actuators and are designed to move the tool 2 in a direction parallel with the axis 15 of rotation of the wheel 14 so as to be able to carry out the operations for mounting, demounting or bead breaking on one side or on the opposite side of the wheel 14. By convention "a" shall be the side of the wheel 14 closest to the wheel-holder arm 12 and "b" shall be the opposite side of the wheel 14. A tool actuator 6 (FIG. 2) acts on the tool holder 4 in such a way that the tool 2 can be moved from an active operating position (Pos. 1 and 4 in FIG. 5) to an non-operating position (Pos. 2 and 3 in FIG. 5) respectively required during the steps of use and the steps of movement of the tool from side "a" to side "b". A rotary tool drive 7 allows the tool to be rotated relative to the tool holder 4 in a direction or the diametrically opposed direction. Said directions are parallel with the axis of the wheel, depending whether operations are performed on side "a" or "b" of the wheel 14.

During normal tyre mounting, demounting or bead breaking operations on or from the rims of wheels of heavy vehicles, a step is usually needed in which the tool 2 is moved from one side of the tyre to the other side. This step is required when, after performing the mounting, demounting or bead breaking operation on the bead of one side of the tyre, the tool 2 must perform the same operation on the opposite bead. This movement requires the operation of a set of controls used to activate suitable actuators which move the tool 2, the tool holder 4 and the tool-holder carriage 3.

To describe these steps, without being too general, it may be assumed that during the initial step the tool 2 is on the inner side "a" of the tyre, with the tool 2 facing the bead. After performing the mounting, demounting or bead breaking operation on the bead on or from the rim, the tool holder 4 must be moved to the outer side "b" of the wheel 14, with the tool 2 facing the inner bead. Therefore the tool 2 has to be rotated through 180° relative to the axis of rotation of its tool holder 4.

Figure 5:
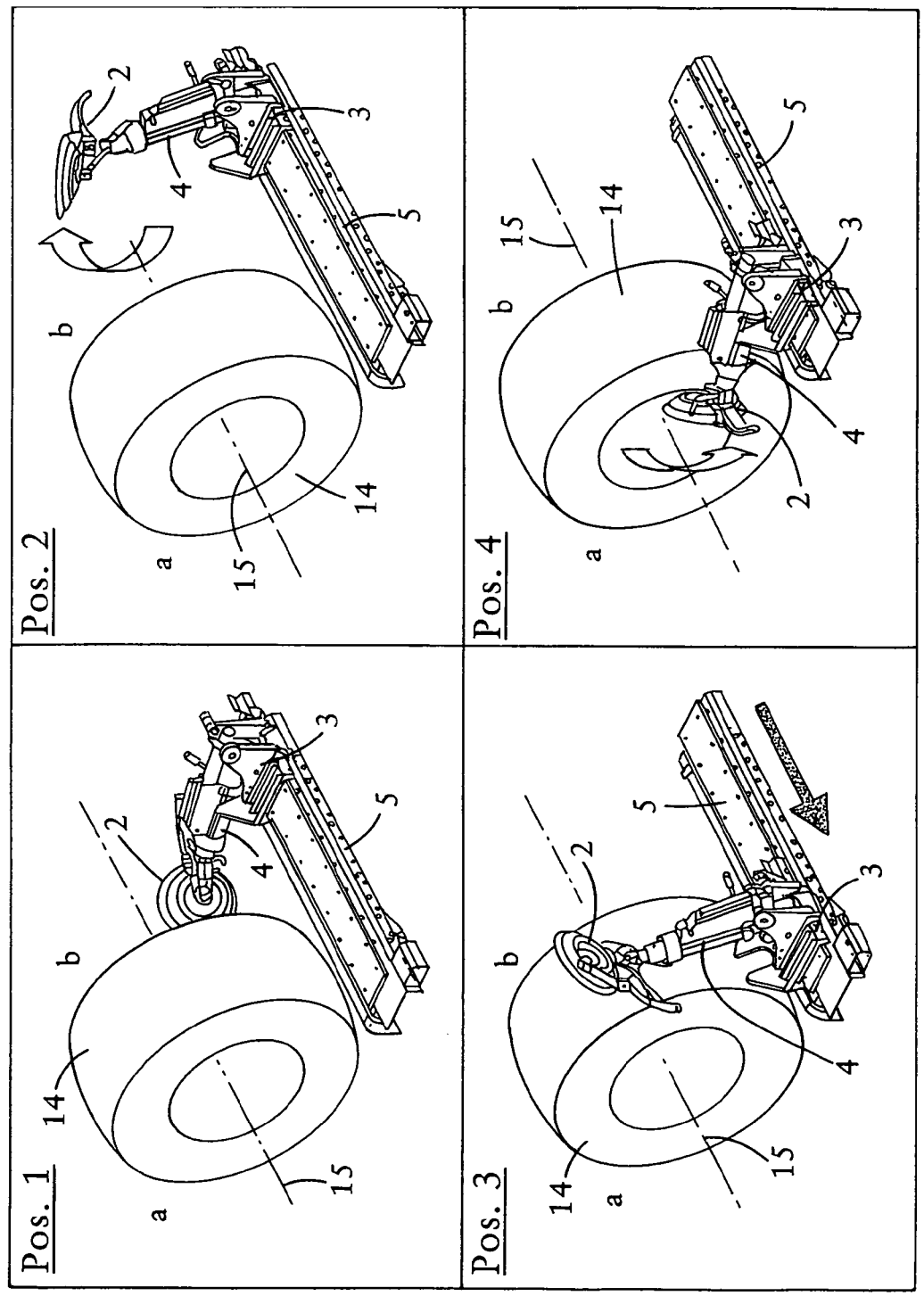
FIG. 5 different positions of the tyre changing tool.

The steps from Pos 1 to Pos 4 in FIG. 5 are carried out by means of a piece of automated equipment which allows the entire operation to be performed by operating a simple control.

Said result is obtained thanks to the presence of a set of control devices:

1) A position transducer 8 which allows a control of the tool-holder carriage 3 travel along is trajectory parallel with the axis 15 of rotation of the wheel 14.
2) A detector 9, for example a microswitch, for detecting tool positioning in the operating position (tool lowered, Pos. 1 and 4 in FIG. 5).

Figure 6:
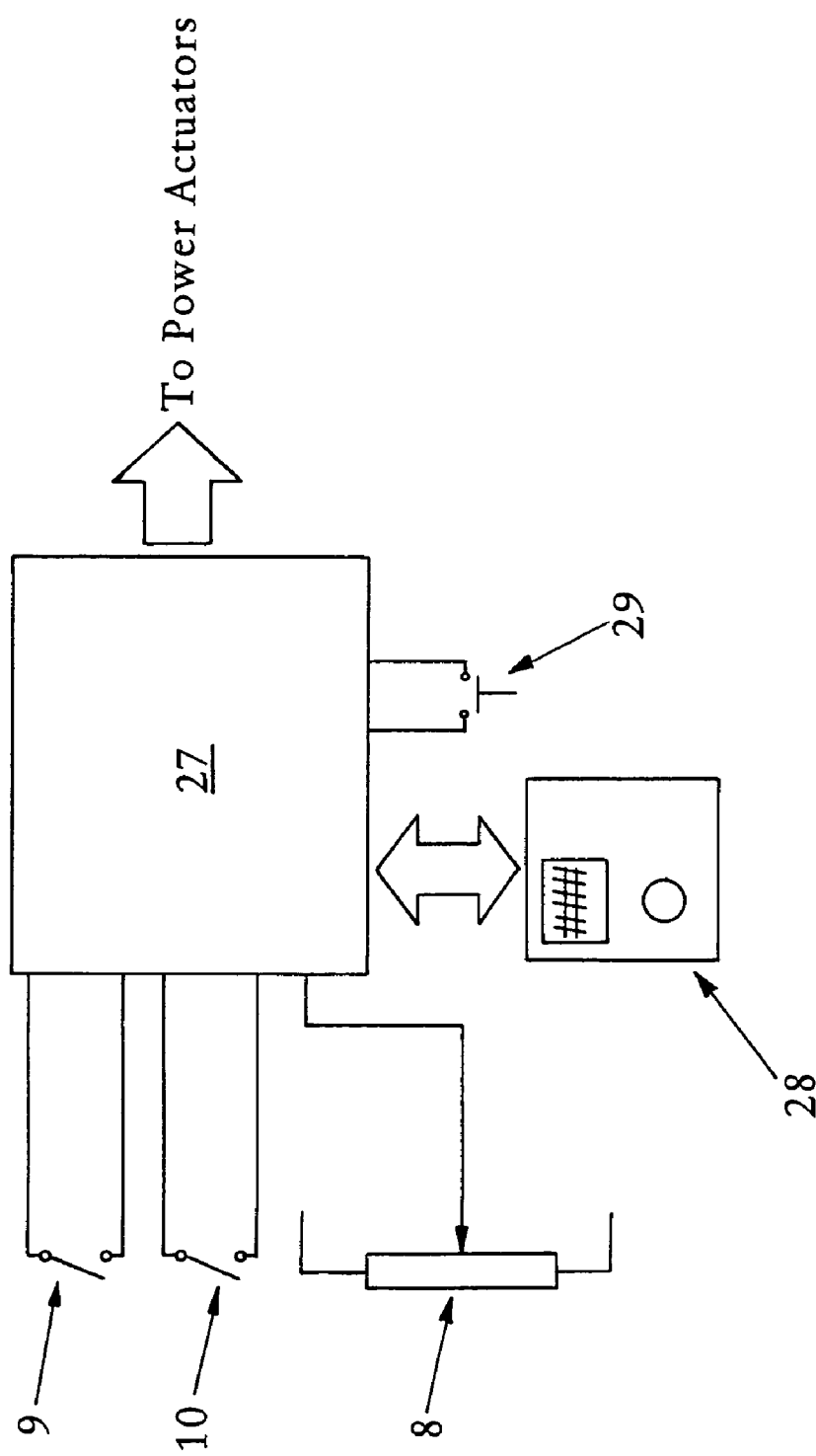
FIG. 6 a block diagram of a control device to control the motion of the tyre changing tool.

3) A detector 10, for example a microswitch, for detecting tool positioning in the non-operating position (tool raised, Pos. 2 and 3 in FIG. 5), 4) Electronic control device (CPU) in FIG. 6.

The position transducer 8 allows a piece of automated equipment to be produced which allows the tool-holder carriage 3 stroke to be set using a graduated control, for example a potentiometer. According to the wheel width, the operator may select the appropriate stroke to be performed by the tool-holder carriage 3 during the operation.

Figure 7:
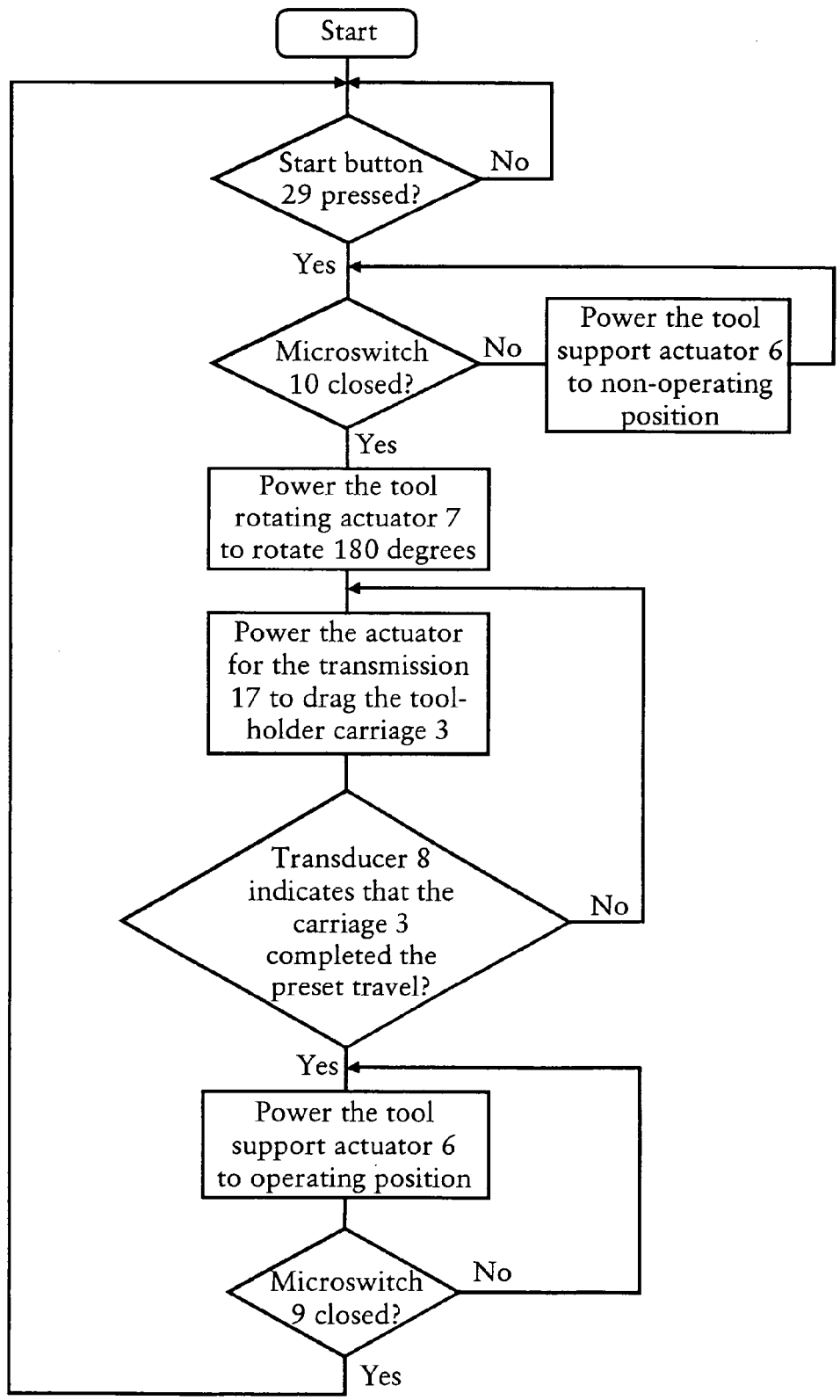
FIG. 7 a flow chart demonstrating the operation of the embodiment.

After presetting the travel (stroke) of the tool-holder carriage 3, the operator presses the respective Start button (from "a" to "b" or from "b" to "a") to allow the entire operation (FIG. 7) to be performed:

1) The detector 9 allows acknowledgement that the tool holder 4 is in the operating position (Pos. 1 or 4 in FIG. 5) and allows it to be raised by operation of the tool actuator 6 moving it to the non-operating position (Pos. 2 or 3 in FIG. 5).

2) The detector 10 is operated when the tool holder 4 reaches the non-operating position (Pos. 2 or 3 in FIG. 5). At this point the tool actuator 6 is inhibited and joint or sequential consent is given to the actuator which operates the rotary tool drive 7 for rotation of the tool holder 4 and to the actuator device 18 designed to operate a mechanical speed-increasing transmission 17 which drags the tool-holder carriage 3.

3) The position transducer 8 indicates that the tool-holder carriage 3 has completed the present travel. Then the actuators of the rotary tool drive 7 and 16 related to rotation of the tool holder 4 and to the mechanical transmission 17 are inhibited and the tool actuator 6 is operated to move the tool holder 4 to the new operating position until the detector 9 is activated, and the tool 2 is therefore ready to carry out the next demounting, mounting or bead breaking step on the bead from or on the rim on the inner side of the wheel 14.

To carry out said steps of demounting, mounting or bead breaking, the carriage 5 is driven by an associated actuator device (not shown).

The FIG. 5 shows the following positions of the tyre changing tool 2:

Pos. 1: The tool 2 is in the operating position on one side (side b) of the wheel 14.

Pos. 2: The tool-holder carriage 3 is kept stationary, the tool 2 is moved to the non-operating position.

Pos. 3: The tool-holder 4 is in the non-operating position, the tool holder carriage 3 moves along a direction parallel with the axis 15 of the wheel 14 until it reaches the inner side "a" of the wheel 15. Before, during or immediately after said translation movement, the tool holder 4 rotates through 180° about its own axis of rotation, so that the tool 2 is angled in the active operating position for use on the inner side "a" of the wheel 14.

Pos. 4: The tool is moved to the operating position, now on the side "a" of the wheel opposite that of pos. 1.

Figure 4:
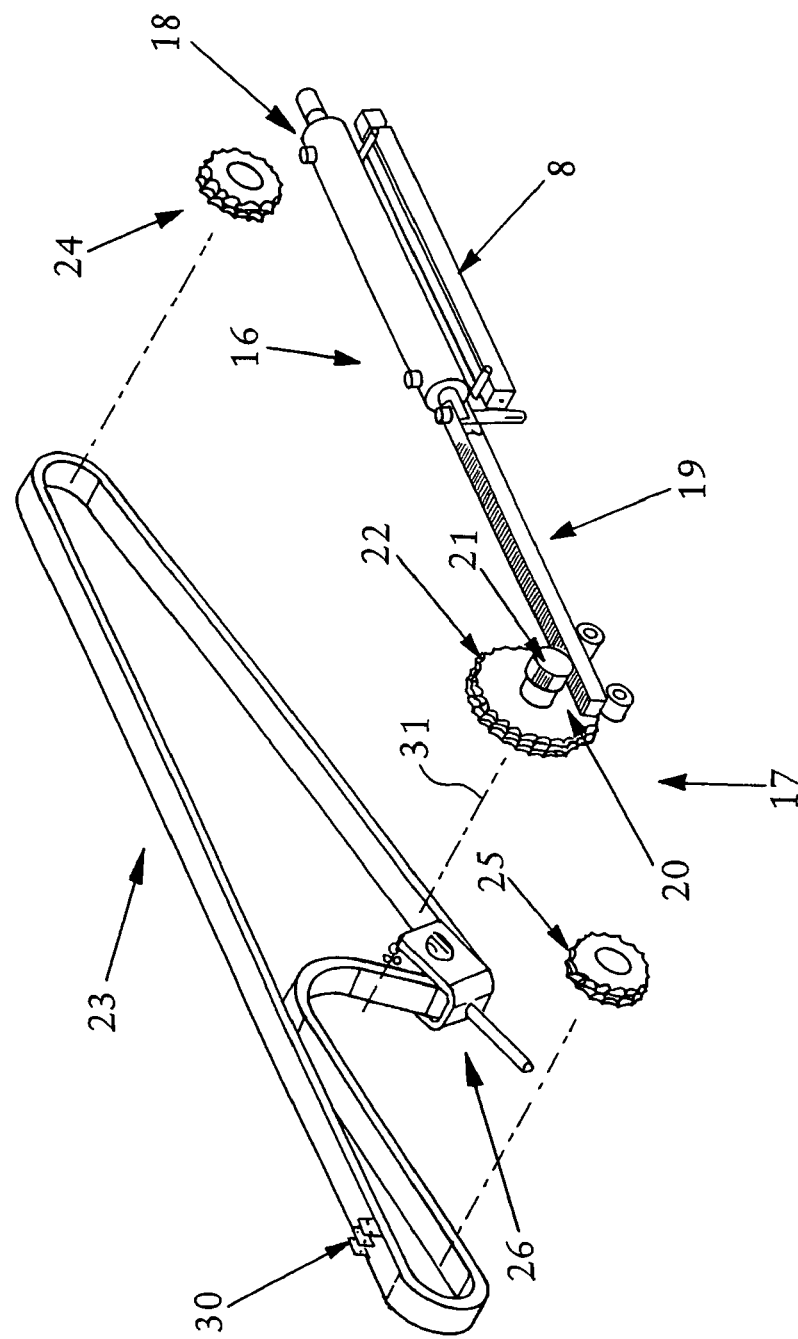
FIG. 4 an additional actuator device and a speed-increasing transmission used in FIG. 1 to 3.

The mechanical speed-increasing transmission 17 provides a solution for dragging the tool-holder carriage 3 on the carriage 5 by means of a transmission chain 23 wound in a loop over two free gear wheels 24, 25 positioned at the ends of the carriage 5 and constrained to it in such a way that they can rotate about their own axes (FIG. 4).

The transmission chain 23 is wound in the kinematic mechanism in such a way that it has a straight stretch between the gear wheels 24, 25 extending for a length not less than the travel required of the tool-holder carriage 3. The tool-holder carriage 3 is anchored at said stretch by means of a connecting element 30 which constrains the carriage 3 to a link of the chain 23.

The chain 23 is driven by a driving sprocket 22 in turn driven by a sprocket 21 with which it is constrained to rotate integrally about a shared sprocket axis 31 wherein the two sprockets 21, 22 forms a gear wheel providing a predetermined gear ratio. The sprocket 21, 22 are rotatably supported at the carriage 5 to which their shared sprocket axis 31 is constrained. Finally, the sprocket 21 is driven in rotation by the translation of a toothed rack 19 driven by a linear actuator 18. The actuator 18 having one end constrained to the carriage 5 and the other end constrained to the rack 19 causes the rack 19 to translate from a first position to a second position respectively corresponding to the fully retracted configuration and the fully extracted configuration of the linear actuator 18. Therefore, the tool-holder carriage 3 correspondingly translates from an initial position to a final position, covering a measurement equal to the actuator travel multiplied by the ratio of the pitch circle diameter of the driving sprocket 22 to the pitch circle diameter of the sprocket 21 (gear ratio). Once an appropriate gear ratio has been selected, the solution just described allows production of a transmission using a linear actuator 18 whose dimensions along the direction of translation of the tool-holder carriage 3 is less than the dimension given by the two limit positions of the carriage 3 on the carriage 5.

The advantage of being able to set the actuator travel effects a reduction in the times required for the operation to demount the tyre from the rim, in particular, with reference to the tubeless wheels of heavy vehicles (trucks), when the tool can move from one operating position to the other (from one side of the tyre to the other), with a simple control. If the tyre width is known, this travel, which can be set, allows the tool to perform the minimum travel in order to move to the operating position. In this way, it is also possible to reduce the movements for the tool approach to the side of the tyre required after positioning said operating position.

A transmission such as the one described above provides a solution for carriage movement using a linear actuator which allows it to be kept compact. Linear actuator dragging systems usually require additional space due to the presence of the cylinder chamber. The solution just described allows production of a transmission in which the linear actuator 18 (cylinder), by means of suitable sizing of the travel gear ratio, has dimensions such that the system does not require additional space to that of the tool holder travel required b the function which must be performed. The invention provides a device for tyre changer machines which allows the tool 2 to pass from one side of the tyre to the other automatically with electric control as described above.

The mechanical transmission device as described above allows the dimensions of the actuator 18 along the direction of movement of the tool-holder carriage, to be kept less than the dimensions required by the tool-holder carriage path. The invention shall also be valid for different kinds of transmission (using direct actuator, by means of other type of transmission, etc.) of a different type of actuator (hydraulic, electric motor, etc.). The transmission in accordance with the invention shall also be valid irrespective of the presence of the piece of automated equipment.

Tyre changer comprising at least one tyre changing tool and a controlled transmission device to pass the at least one tyre changing tool from one side of the tyre to its other side, wherein the dimensions of the stroke generated by the actuator 18 along the direction of the movement of the tool holder 4 are less than the dimensions of a tool holder carriage path.

Thus the overall length of the additional actuator device 16 can be constructed shorter than the longest possible stroke of the tool holder carriage 3.

REFERENCE LIST

1 wheel holder device
2 tyre changing tool
3 tool holder carriage
4 tool holder
5 carriage
6 tool actuator
7 rotary tool drive
8 position transducer
9 position detector for the tool
10 position detector for the tool
11 wheel clamping and centering device
12 wheel holder
13 frame
14 wheel
15 wheel axis
16 additional actuator device
17 mechanical speed-increasing transmission
18 linear actuator
19 toothed rack
20 gear wheel
21 sprocket
22 sprocket
23 transmission chain
24 gear wheel
25 gear wheel
26 chain tensioner
27 electronic control device (CPU)
28 data display
29 start button (forward, reverse)
30 connecting element
31 sprocket axis

The invention claimed is:

1. Tyre changer apparatus comprising:

a horizontally extended frame;

a wheel holder device provided on said frame and designed to support a tyred wheel with horizontally positioned wheel axis;

a carriage supported movably along the frame;

a tool holder provided on the carriage;

at least one tyre changing tool for mounting the tyre onto the wheel and/or for demounting the tyre from the wheel; and actuator means to move the tool holder on the carriage to operating positions in which the tyre changing tool is able to act on the tyre for mounting or demounting on both sides of the tyre, wherein during the mounting operation or demounting operation the carriage is driven by an actuator device along the frame, and the tool holder is movably supported on a tool holder carriage which is movably supported on said carriage and driven by an additional actuator device provided on said carriage, wherein said additional actuator device is in drive connection with the tool holder carriage via a mechanical speed-increasing transmission.

2. The apparatus according to claim 1, wherein a position transducer is provided on the carriage to select an appropriate stroke of the tool holder carriage dependent from the width of the tyre.

3. The apparatus according to claim 1, wherein the tool holder carriage is guided on the carriage in a direction parallel to the wheel axis.

4. The apparatus according to claim 1, wherein the mechanical speed-increasing transmission comprises a gear wheel having two sprockets with different diameters wherein the sprocket with the smaller diameter is in drive connection with the additional actuator device and the sprocket with the greater diameter is in drive connection with the tool holder carriage.

5. The apparatus according to claim 1, wherein the additional actuator device includes a linear actuator whose stroke is transmitted by the mechanical speed-increasing transmission.

6. The apparatus according to claim 4, characterized in that the additional actuator device comprises a toothed rack which is driven by the linear actuator and is in engagement with the gear wheel of the mechanical speed-increasing transmission.

7. The apparatus according to claim 6, wherein the sprocket with the smaller diameter is in engagement with the toothed rack and the sprocket with the greater diameter is in engagement with a transmission chain to which the tool holder carriage is connected.

8. The apparatus according to claim 7, wherein the transmission chain is guided over two gear wheels which are rotatably supported on said carriage in a distance from each other and in positions to determine the stroke of the tool holder carriage parallel to the wheel axis.

9. The apparatus according to claim 6, wherein the stroke of the toothed rack is shorter than the stroke of the tool holder carriage.

10. The apparatus according to claim 7, wherein a chain tensioner is fixed on the carriage to tighten the transmission chain.

11. The apparatus according to claim 1, wherein the overall length of the additional actuator device is smaller than the stroke of the tool holder carriage.

\* \* \* \* \*